June 27, 1972   R. J. TOLMIE   3,673,001
CONTROL MEANS FOR A RECHARGEABLE BATTERY
Filed June 29, 1970   2 Sheets-Sheet 1
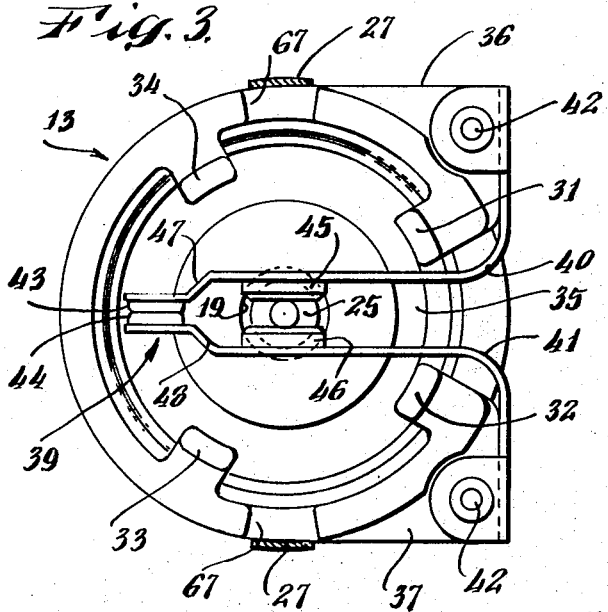
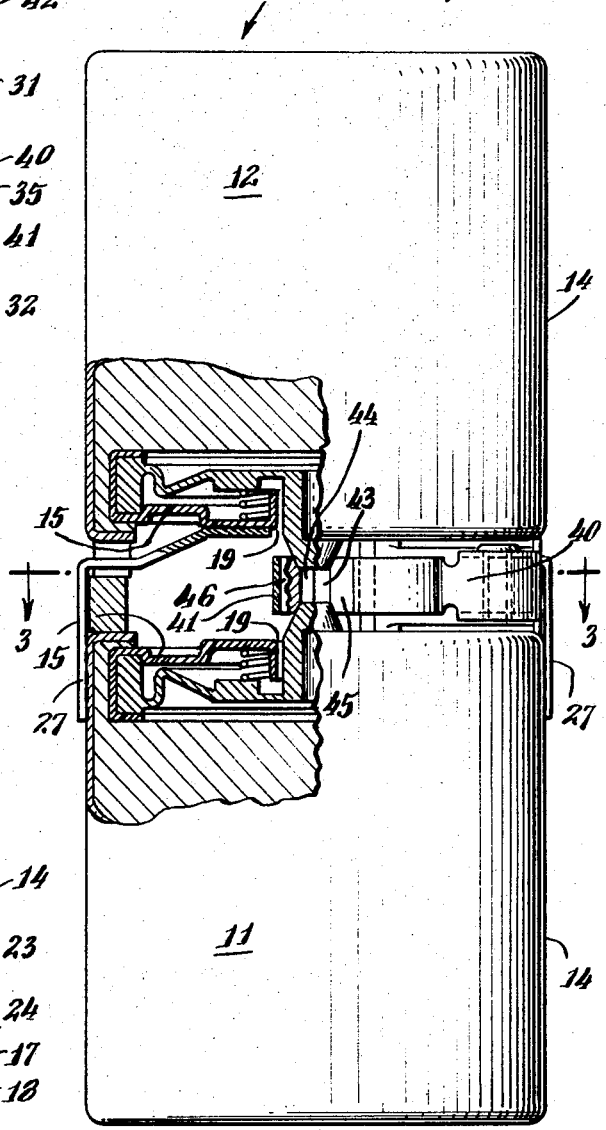
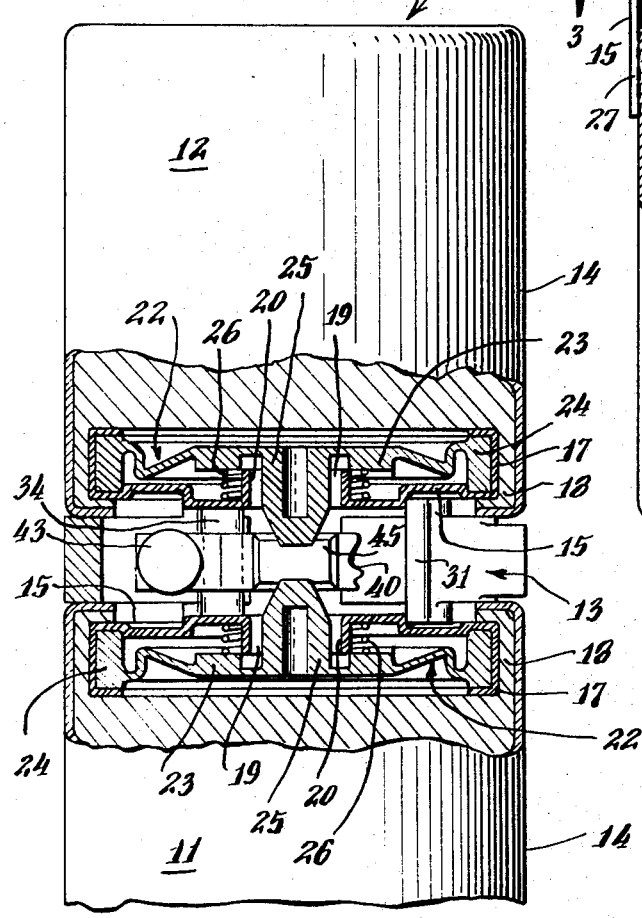
INVENTOR.
Robert J. Tolmie
BY
ATTORNEY.

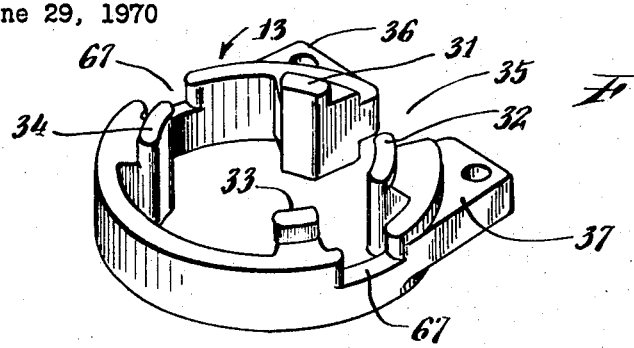
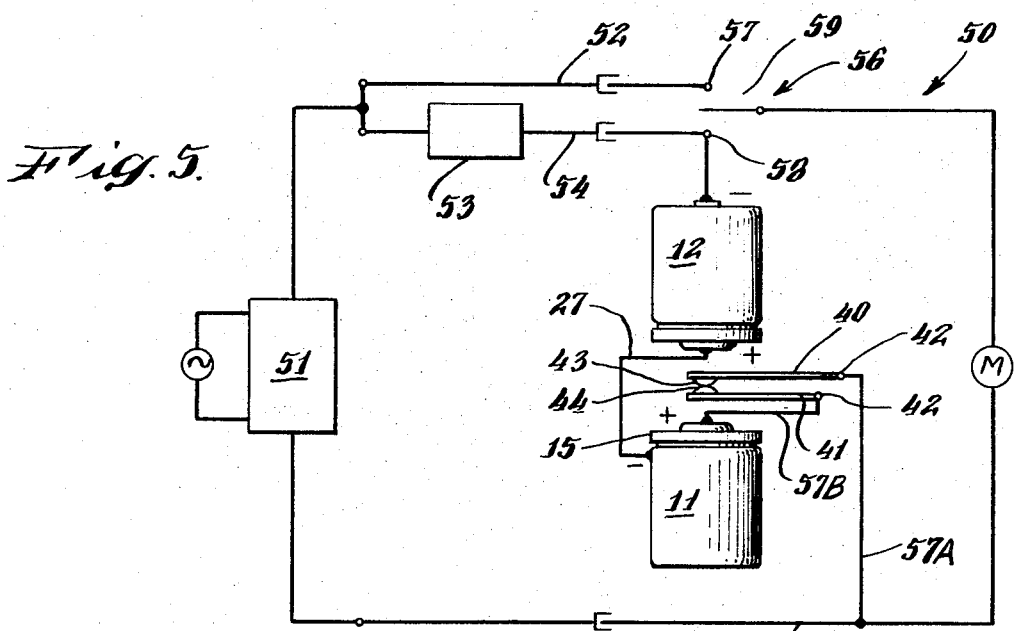
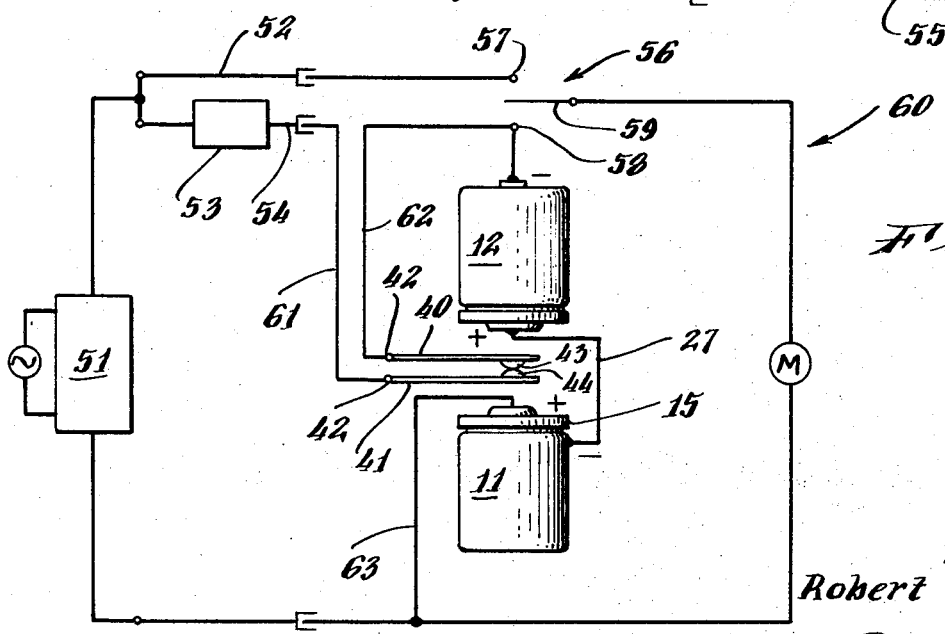

United States Patent Office 3,673,001
Patented June 27, 1972

3,673,001
CONTROL MEANS FOR A RECHARGEABLE BATTERY
Robert J. Tolmie, Fairfield, Conn., assignor to Sperry Rand Corporation, New York, N.Y.
Filed June 29, 1970, Ser. No. 50,573
Int. Cl. H01m 1/04
U.S. Cl. 136—110           7 Claims

ABSTRACT OF THE DISCLOSURE

Means to control the charging of a rechargeable battery and which means include a spring restrained pressure responsive diaphragm within the battery and a pair of electrical contacts in circuit with the battery and the charging means for the battery. A switch actuator is moved by the diaphragm to actuate the contacts and open the battery charging circuit when a predetermined charge condition of the battery is reached.

BACKGROUND OF INVENTION

The present invention is directed to new and useful improvements in means to control the charging of a rechargeable battery and more particularly to means for controlling the opening and closing of a battery charging circuit.

Battery operated appliances such as cord/cordless electric shavers generally include at least one sealed rechargeable battery incorporated therein. Some cord/cordless shavers operate from a pair of batteries in order to meet operating voltage requirements. Generally when a pair of batteries are included in a rechargeable appliance it has been found desirable to connect these batteries together to form a power pack unit therey simplifying assembly and repair of the appliance.

During charging of the batteries the electrolyte therein can generate gases that build up in pressure within the sealed casing. If the charging process continues for an uncontrolled amount of time gas pressures in the battery can cause the cell to rupture and damage the shaver. In order to control the charging of a battery and to prevent rupture thereof it is known to provide means for terminating the charging process at a given pressure condition within the battery which pressure corresponds to a desired state of charge.

One known charge terminating means comprises a pressure responsive circuit breaking member provided within the battery casing. The pressure responsive member undergoes deflective movement as internal cell pressures increase during charging. These means also include a contact member electrically interconnected to a charging circuit and which contact member is in conductive engagement with the battery casing for delivery of charging current thereto. At a predetermined charge-induced gas pressure in the battery casing the pressure responsive member pushes the contact member away from the battery casing to open the charging circuit. However, as charging current is delivered through the contact directly to the battery casing it is necessary to provide separate contact members for each battery being charged.

Another pressure responsive circuit breaking member includes a deflectible pressure responsive diaphragm provided in a separately sealed container disposed away from the battery. The battery and container are interconnected by a conduit that leads charge induced gases from the battery to the container. During the battery charging process gas pressures build up in the container causing the diaphragm therein to deflect. The deflective movement of the diaphragm is transmitted to a circuit breaking switch member which switch is actuated to an open circuit condition at a predetermined pressure thereby terminating the charging process. Due to space requirements devices of this nature cannot be readily used in small appliances. In addition this device requires special valve fittings on the battery to connect the gas conduit and diaphragm container thereto.

It is an object of this invention to provide novel means for controlling the charge of a rechargeable battery.

Another object is to provide novel means for controlling the charge of a rechargeable battery including novel means for opening the charging circuit at a predetermined charge condition of the battery:

Still another object is to provide novel means for controlling the charge of a rechargeable battery including a novel distortion free pressure responsive member for controlling a circuit breaking actuator;

A further object is to provide novel means for controlling the charge of a rechargeable battery including resilient means for restoring a pressure responsive circuit breaking member to a precharge or circuit establishing position;

A still further object of this invention is to provide novel means for controlling the charge of a rechargeable battery including novel circuit breaking and establishing switch means;

Still another object of this invention is to provide novel switch means for simultaneously controlling the charging of more than one battery.

SUMMARY OF THE INVENTION

The present invention contemplates novel means for controlling the charge of a rechargeable battery during a charging cycle.

In one embodiment a pair of rechargeable batteries are electrically connected in series with a pair of normally closed circuit breaking contacts having contact arms that are electrically connected to but physically disassociated from either battery. Each battery is provided with an internal pressure responsive diaphragm having resilient restraining means and an actuator extending from the diaphragm. The batteries further comprise a conductive end plate having an opening in alignment with the actuator. During charging of the batteries gases generated therein deflect the diaphragm against the resilient restraining means which deflection causes the actuators to move in the end plate opening towards the contact arms. At a predetermined charge condition of the battery the actuators will be disposed intermediate the contact arms to diverge them thereby separating the contact breaker points to open the charging circuit. As the charging current for both batteries passes through the contact points the actuator in either battery can open the charging circuit. When the gas pressure within the batteries subsides the expansion of the resilient restraining means restores the diaphragm to the initial precharge position.

The above and other objects and advantages of the present invention will appear more fully hereinafter from a consideration of the detailed description which follows taken together with the accompanying drawings wherein one embodiment of the present invention is illustrated.

DESCRIPTION OF THE DRAWINGS

In the drawings:

FIG. 1 is a front elevational view partly shown in section, of a power pack comprising a pair of rechargeable batteries and in which pack is incorporated one embodiment of the present invention;

FIG. 2 is a view similar to that of FIG. 1 with the power pack rotated 90° from the position shown in FIG. 1;

FIG. 3 is a sectional view thereof taken on the line 3—3 of FIG. 2;

FIG. 4 is a perspective view of a battery spacer;

FIG. 5 is a schematic wiring diagram of a battery charging and motor operating circuit incorporating an embodiment of the present invention;

FIG. 6 is a schematic wiring diagram of another variation of a battery charging and motor operating circuit incorporating an embodiment of the present invention.

DETAILED DESCRIPTIOIN

Referring to the drawings for a detailed description of the present invention a rechargeable battery pack incorporating one embodiment thereof is generally indicated by the reference numeral 10 in FIG. 1.

Battery pack 10 includes two rechargeable batteries identified by reference numerals 11 and 12 in FIG. 1. Rechargeable battery 12 (FIG. 1) is disposed over battery 11 and spaced therefrom by a spacer 13 (FIGS. 1 and 3). Under this arrangement batteries 11 and 12 are simultaneously charged in a manner to be hereinafter described in detail. Although description of the battery structure will be directed to battery 11 battery 12 is of identical structure and the same reference numbers are applied to corresponding parts thereof.

Battery 11 is of the nickel-cadmium type and comprises a cylindrical casing having an outer casing portion 14 that serves as the cathode thereof and a conducting plate 15 at one end of casing 14 that serves as the anode thereof. The electrolyte which is not shown is disposed below and spaced from conducting plate 15. Plate 15 (FIG. 1) includes an annular peripheral rim 17 that is spaced and insulated from casing 14 by a suitable insulating material 18 provided therebetween. Plate 15 (FIGS. 1, 2 and 3) further includes a central opening 19 and a piercing collar 20 depending therefrom.

Battery 11 (FIG. 1) further comprises a moveable pressure responsive member 22 disposed in the space between plate 15 and the electrolyte. Member 22 (FIG. 1) comprises a resilient circular diaphragm 23 formed of a suitable elastic material having a peripheral annular portion 24 secured to rim 17 of plate 15. Diaphragm 23 (FIG. 1) includes a switch actuating plunger 25 projecting therefrom in alignment with opening 19 of plate 15.

As mentioned it is a feature of this invention to provide novel means for restoring a pressure responsive member to a precharge or circuit establishing position. To accomplish this, resilient restraining means such as a coil spring 26 (FIG. 1) is provided around plunger 25 with one end of spring 26 bearing against diaphragm 23 and the opposite end bearing against the under side of plate 15.

Spacer 13 (FIGS. 3 and 4) is formed of any suitable insulating material and is of generally flat annular shape. Spacer 13 (FIG. 4) includes four legs 31, 32, 33 and 34 protruding from the annular surface thereof, the opposite ends of which legs (FIGS. 2 and 3) extend toward end plates 15 of batteries 11 and 12. If desired the opposite ends of legs 31, 32, 33 and 34 can be adhesively bonded to plates 15 of batteries 11 and 12. A gap 35 (FIGS. 3 and 4) is provided between legs 31 and 32 and a pair of contact mounting portions 36 and 37 (FIGS. 3 and 4) are respectively formed adjacent thereto.

Spacer 13 (FIG. 4) further includes a pair of oppositely disposed U-shaped slots designated 67 provided between legs 31 and 34 and legs 32 and 33. A pair of rigid L-shaped metal strips designated 27 (FIG. 2) are each disposed in slots 67 of spacer 13. Each strip 27 has one end portion welded to plate 15 (FIG. 2) of battery 12 and the other end portion welded to casing 14 of battery 11. In this manner batteries 11 and 12 are electrically interconnected and physically held together as a power-pack unit.

As seen in FIGS. 1, 2 and 3 a circuit breaking and establishing switch arrangement 39 is provided to simultaneously control the charging of batteries 11 and 12.

Switch 39 (FIG. 3) includes contact means comprising a pair of spaced elongated contact arms 40 and 41 made of a resilient conducting material and which arms are disposed in gap 35 of spacer 13 between end plates 15 (FIG. 1) of batteries 11 and 12. One end of each contact arm 40 and 41 (FIG. 3) is secured to a respective mounting portion 36 and 37 of spacer 13 by a terminal post designated 42 (FIG. 3) and which terminal posts are in conductive engagement with arms 40 and 41. The opposite free ends of contact arms 40 and 41 (FIG. 3) are provided with opposed normally closed breaker points 43 and 44.

Arms 40 and 41 further include a pair of spaced and opposed pads 45 and 46 (FIG. 3) respectively secured thereto in alignment with end plate openings 19 (FIG. 1) of batteries 11 and 12. Contact arms 40 and 41 (FIG. 3) are provided with bent portions 47 and 48 adjacent breaker points 43 and 44 such that pads 45 and 46 are spaced one from the other when breaker points 43 and 44 are in their normally closed position.

Batteries 11 and 12 are connected into a typical charging circuit generally referred to by numeral 50 (FIG. 5) and which circuit is shown in block schematic. The input portion of circuit 50 (FIG. 5) includes means 51 for reducing alternating line voltage to a unidirectional operational range, impedance varying means 53 on a conductor 54 for varying the current delivered to batteries 11 and 12, and a branch conductor 52. The output portion of circuit 50 (FIG. 5) includes a motor M, a return conductor 55, and a three-position switch 56 connected in series with motor M. Switch 56 includes a pair of stationary contacts 57 and 58, and a movable switch arm 59 which is normally disposed in an open position between contacts 57 and 58.

Batteries 11 and 12 are shown in outline form in FIG. 5 and are connected in series with breaker points 43 and 44. Breaker point 43 is electrically connected to conductor 55 by securing one end of a conductor 56 to terminal post 42 (FIG. 3) of contact arm 40 and the other end thereof to conductor 55. In a like manner breaker point 44 is electrically interconnected to plate 15 of battery 11 by securing one end of a conductor 57 to terminal post 42 of arm 41 (FIG. 3) and the opposite end thereof to plate 15.

To charge batteries 11 and 12 movable switch arm 59 is placed in a normally open position to permit charging current to pass through cells 11 and 12 and breaker points 43 and 44. Prior to the charging process diaphragm 23 (FIG. 1) is disposed in a first limit position corresponding to precharge pressure conditions in the battery.

During the charging process and especially if the batteries are being rapidly charged the electrolyte therein generates gases that cause a buildup of pressure within battery casing 14. Consequently pressure conditions in the battery during charging generally corresponds to the charge condition thereof.

When internal battery pressures reach a predetermined level sufficient to detect diaphragm 23 toward plate 15 thereby compressing spring 26 (FIG. 1) plunger 25 will move in opening 19 (FIG. 1) toward pads 39 and 40. Due to the spring constant of spring 26 (FIG. 1) diaphragm 23 will consistently deflect in predetermined increments for given pressure conditions in battery casing 14. At an internal battery pressure corresponding to the desired state of battery charge plunger 25 (FIG. 1) is disposed intermediate pads 45 and 46 to diverge arms 40 and 41 and thereby break the electrical contact between breaker points 43 and 44. The battery charging circuit (FIG. 5) is thus opened and the charging process terminated. It will be appreciated that under this circuit arrangement (FIG. 5) the battery charging process can be terminated when either one or both plungers 25 diverge arms 40 and 41.

After completion of the charging process motor M can be operated from batteries 11 and 12 by bringing movable switch arm 59 (FIG. 5) into engagement with stationary contact 58. However, gas pressures in cells 11 and 12 must subside sufficiently to permit plunger 25 to recede into opening 19 (FIG. 1) to enable breaker points 43 and 44 (FIG. 3) to resume their normally closed position. The battery-motor portion of the circuit thus remains open until internal gas pressures within cells 11 and 12 subside by recombination of the gaseous components with the electrolyte.

If by some inadvertency breaker points 43 and 44 (FIG. 5) are not separated to open the charging circuit at the desired battery charging condition the charging process continues and diaphragm 23 (FIG. 1) will deflect towards plate 15 to be penetrated by piercing collar 20. In this instance gases formed within the battery escape through diaphragm 23 without causing rupture of the battery casing. The position of diaphragm 23 just prior to penetration by collar 20 is the maximum displacement limit position thereof due to exhaustion of the gaseous components through the diaphragm.

In another circuit arrangement 60 shown in FIG. 6 the input circuit portion is identical with that of circuit 50 (FIG. 5). In the output portion of circuit 60 (FIG. 6) breaker point 44 is electrically connected to conductor 54 by securing opposite ends of a conductor 61 to terminal posts 42 of arm 41 and conductor 54 respectively. In a like manner breaker point 43 is electrically connected to stationary contact 58 by securing opposite ends of a conductor 62 to terminal post 42 (FIG. 3) of arm 40 and contact 58 respectively. A conductor 63 connects plate 15 of battery 11 to conductor 55. To charge batteries 11 and 12 movable switch arm 59 is placed in a normally open position (FIG. 6). The charging process is terminated when breaker points 43 and 44 are separated by the positioning of plunger 25 (FIG. 1) between pads 45 and 46 (FIG. 3). Motor M can then be operated from batteries 11 and 12 by placing movable switch arm 59 in engagement with stationary contact 58. However, due to the electrical position of breaker points 43 and 44 intermediate impedance varying means 53 and stationary contact 58 motor M can be driven from the battery immediately after the charging process has been completed. Thus under this circuit arrangement (FIG. 6) battery operation of motor M is not dependent upon the open or closed position of breaker points 43 and 44.

It will be apparent from the foregoing that an advantage of the novel control means for controlling the charge of a rechargeable battery is a spring restrained pressure responsive member that consistently opens the charging circuit at a single predetermined charge condition of the battery. Another advantage is that the breaker points of the control means can be physically isolated from the battery casing such that more than one battery can be simultaneously charged and controlled by the same switch means. Still another advantage is that the circuit breaking contact points can be electrically connected at any position in the circuit to permit battery operation of the motor immediately after the charging process has terminated.

Although one embodiment of the present invention is illustrated and described in detail it is to be expressly understood that the invention is not limited thereto. Various changes can be made in the design and arrangement of parts without departing from the spirit and scope of the invention as the same will now be understood by those skilled in the art.

What is claimed is:
1. A rechargeable battery comprising,
  (a) a sealed battery casing,
  (b) switch means electrically connected to said casing and to means for replenishing the charge of said battery,
  (c) said switch means including electrical contact means,
  (d) means associated with said battery for supporting said contact means adjacent said casing,
  (e) pressure responsive means provided in said casing and movable between a pair of spaced limit positions within said casing in response to gas pressure generated within said battery during the charging thereof,
  (f) actuator means associated with said pressure responsive means and movable by said pressure responsive means to actuate said contact means to open the circuit from said battery to said charge replenishing means at a moved position of said pressure responsive means,
  (g) resilient biasing means associated with said pressure responsive means for controlling movement thereof between said spaced limit positions, and
  (h) said pressure responsive means including an elastic diaphragm, said actuating means including an actuating member secured to said diaphragm, said battery including a conducting plate provided at one end of said battery and spaced from said pressure responsive means, said plate having an opening in alignment with said actuating member to permit movement of said actuating member in said opening, said end plate including an annular piercing collar depending from said opening toward said diaphragm, said electrical contact means including opposed elongated movable contact arms having normally closed contact portions and opposed spacer pads provided on said arms alongside said contact portions, said actuating member moving in said opening and between said opposed spacer pads in response to increased pressure within the battery to separate said contact portions thereby opening the circuit from said battery to said charge replenishing means, and said piercing collar piercing said diaphragm in response to failure of said actuating member to separate said contact portions in response to said increased pressure.

2. The device of claim 1 wherein said resilient biasing means comprise a coil spring, said coil spring being disposed around said actuating member between said diaphragm and said end plate, said spring having one end bearing against said diaphragm and an opposite end bearing against said end plate such that deflection of said diaphragm toward said end plate compresses said coil spring against said end plate and moves said actuating plunger in said opening toward said contact means.

3. The device of claim 1 wherein said contact means comprise a pair of normally closed contact points and wherein during charging of the battery gases generated therein deflect said diaphragm toward said end plate to move said actuating member in the opening of said end plate to said moved position intermediate said contact means to separate said contact points at a predetermined gas pressure condition in said battery thereby opening the electrical connection between said battery and said charge replenishing means.

4. A rechargeable power-pack for a battery-operated appliance comprising,
  (a) a pair of rechargeable batteries each of said batteries having a first end and a sealed casing,
  (b) means for rigidly connecting said batteries to one another so that said first ends are disposed in adjacent spaced relationship,
  (c) means for electrically connecting said batteries one to the other,
  (d) pressure responsive means provided in each of said casings at said first end thereof and respectively movable between a pair of spaced limit positions within the casing associated therewith in response to gas pressures generated within the battery associated therewith during charging thereof,
  (e) a switch provided between said respective pressure responsive means and electrically connected to said batteries and to means for replenishing the charge of said batteries,
  (f) said switch including eelctrical contact means,
  (g) mounting means associated with said batteries for supporting said switch between said respective pressure responsive means, and (h) actuator means associated with both of said pressure responsive means and adapted to be moved by either of said pressure responsive means to actuate said contact means to open the circuit from said batteries to said charge replenishing means to terminate the charge replenishing cycle at a moved position of one said pressure responsive means.

5. The device of claim 4 wherein said contact means comprise a pair of normally closed contact points, each of said pressure responsive means deflecting toward said contact means during charging of the batteries, and either one of said actuating members separating said contact points to open the electrical connection between said batteries and said charge replenishing means.

6. The device of claim 4 wherein said means for electrically connecting said batteries comprising the means for rigidly connecting said batteries to one another and including a rigid metal strip having a first portion secured to said first end of one of said batteries and a second portion secured to said casing of said other battery such that said batteries are electrically connected in series and said first ends are disposed in adjacent spaced relationship.

7. The device of claim 6 wherein said mounting means include an insulated annular ring disposed between said adjacent spaced first ends of said batteries said ring including four legs having opposite ends protruding from said ring toward said first ends of said batteries said mounting means further including a gap between an adjacent pair of said legs for insertion of said contact means therein, said mounting means further including a mounting portion formed adjacent each of said pair of legs for support of said contact means.

References Cited

UNITED STATES PATENTS

| | | | |
|---|---|---|---|
| 2,651,669 | 9/1953 | Neumann | 136—182 |
| 3,373,057 | 3/1968 | Jost et al. | 136—179 |
| 3,314,824 | 4/1967 | Spanur | 136—178 |
| 3,081,366 | 3/1963 | Belove | 136—165 |
| 2,938,111 | 5/1960 | Keilman | 136—133 |
| 2,269,040 | 1/1942 | Rublee | 136—179 |

DONALD L. WALTON, Primary Examiner

U.S. Cl. X.R.

136—173, 181